United States Patent [19]
Calver

[11] Patent Number: 5,581,986
[45] Date of Patent: Dec. 10, 1996

[54] LOW POLLUTING LAWN MOWER

[75] Inventor: David A. Calver, Greensboro, N.C.

[73] Assignee: Envirogard, Inc., Greensboro, N.C.

[21] Appl. No.: 289,513

[22] Filed: Aug. 12, 1994

[51] Int. Cl.⁶ ................................................. A01D 34/03
[52] U.S. Cl. .................. 56/12.7; 56/14.8; 56/17.1; 56/17.5; 123/525
[58] Field of Search ................. 56/12.7, 14.7, 56/14.8, 17.1, 17.2, 17.5; 123/525, 527, 528, 529

[56] References Cited

U.S. PATENT DOCUMENTS

| | | | |
|---|---|---|---|
| 3,948,226 | 4/1976 | Green et al. | 123/18 R |
| 3,970,059 | 7/1976 | Pisar | 123/103 B |
| 4,386,594 | 6/1983 | Szloboda | 123/525 |
| 4,398,521 | 8/1983 | Schuurman | 123/527 |
| 4,492,208 | 1/1985 | Lent | 123/527 |
| 4,535,728 | 8/1985 | Batchelor | 123/525 X |
| 4,553,519 | 11/1985 | Masson | 123/527 |
| 4,651,682 | 3/1987 | Pefley et al. | 123/327 X |
| 4,688,537 | 8/1987 | Calkins et al. | 123/557 |
| 4,884,530 | 12/1989 | Boekhaus et al. | 123/525 X |
| 5,010,868 | 4/1991 | Clements | 123/527 |
| 5,069,190 | 12/1991 | Richards | 123/538 |

OTHER PUBLICATIONS

Repair Parts Identification, Tractor Mower Model #917, 255440 (3 sheets), undated.

Primary Examiner—Roger J. Schoeppel
Attorney, Agent, or Firm—Rhodes Coats & Bennett, L.L.P.

[57] ABSTRACT

A low-polluting lawn mower includes a frame having ground-engaging wheels, a seat for a driver and a steering mechanism to permit the driver to control the direction of movement of the lawn mower on the frame, a four-cycle engine mounted on the frame and having a drive shaft operatively engaged with one of the wheels so that the engine propels the lawn mower, a propane gas supply on the frame including a tank containing liquified propane gas, a fuel connection from said propane gas supply to the engine including a carburetor having a venturi and equipped with a spud to feed propane to the venturi and a fuel control assembly including a regulator and a fuel lockoff, and a blade operatively engaged with the drive shaft so as to be driven for cutting grass when the engine is fueled by propane from the supply.

25 Claims, 2 Drawing Sheets

LOW POLLUTING LAWN MOWER

BACKGROUND OF THE INVENTION

The present invention relates to improved lawn and garden equipment, relating more particularly to lawn mowers to reduce the emissions which contribute to air pollution.

Most lawn mowers in the United States are powered by internal combustion engines which run on gasoline fuel, although there are some electrical machines available. However, gasoline-powered mowers have recently been implicated as contributors of air pollutants due to the incomplete combustion of gasoline. Authorities such as the California Air Resources Board have pinpointed lawn mowers and other gasoline-powered internal combustion engines used on lawn and garden equipment as significant contributors to air pollution.

It is known that engines that are designed to be run on gasoline as a fuel can be converted to use propane as a fuel. This is done, for example by the A. L. Cook Company of Greensboro, N.C. for engines to be mounted on floor buffers. These floor buffers are used inside buildings, without danger of the build-up of toxic emissions. Also, it is common to use propane fuel to power vehicles inside plants, and the like.

However, to applicant's knowledge, no one has previously made the connection that air pollution problems from gasoline powered engines can be reduced by fueling them with propane.

Accordingly, there continues to exist a need for a way to reduce the emissions from lawn and garden equipment, particularly lawn mowers in order to reduce their contributions to air pollution.

SUMMARY OF THE INVENTION

The present invention fulfills this need in the art by providing a low-polluting lawn appliance including a frame having ground-engaging wheels, a four-cycle engine mounted on said frame and having a drive shaft, a propane gas supply on said frame, a fuel connection from said propane gas supply to said engine, and a tool operatively engaged with said drive shaft so as to be driven for accomplishing work when said engine is fueled by propane from said supply.

A common form of the low-polluting appliance is a lawn mower including a frame having ground-engaging wheels, a four-cycle engine mounted on the frame and having a drive shaft, a propane gas supply on the frame, a fuel connection from the propane gas supply to the engine, and a blade operatively engaged with the drive shaft so as to be driven for cutting grass when the engine is fueled by propane from the supply.

Typically, the propane gas supply includes a tank containing liquified propane, and the fuel connection includes a fuel control assembly including a regulator that reduces the pressure of the gaseous propane from in excess of 200 pounds per square inch to 1–5 pounds per square inch. In a preferred embodiment the regulator reduces the pressure to about 4 pounds per square inch.

In a preferred embodiment the drive shaft is operatively engaged with one of the wheels so that operation of the engine propels the lawn mower. The frame may include a seat for a driver and a steering mechanism to permit the driver to control the direction of movement of the lawn mower.

Preferably, the fuel connection includes a control assembly including a regulator and a fuel lockoff. The lockoff may be a normally closed, electrically-openable valve to positively close the fuel connection when operation is not desired. An ignition switch may be coupled to the engine having an on position and an off position to operate the engine when the switch is in its on position and to turn the engine off when in the off position. The ignition switch may include a pole connection to the electrically-operable valve to open the valve when the ignition switch is in the on position.

In a preferred embodiment the fuel connection includes a carburetor that has a venturi and a spud to feed propane to the venturi. The spud is configured as a hollow tube to convey gaseous propane to the venturi. Preferably, the hollow tube has an upstream end and an adjustable valve at the upstream end to control the amount of propane the spud delivers to the venturi. Usually, the carburetor includes a metering valve upstream of the venturi to control the airflow through the venturi and therefore control the amount of suction of propane through the spud.

The invention also provides a method of cutting grass including the steps of providing a lawn mower having an engine equipped to burn propane, providing a propane supply to the engine, feeding propane from the propane supply to the engine, burning the propane in the engine to drive a shaft, and moving a blade affixed to the shaft in proximity to grass to cut the grass.

In one embodiment the method further includes propelling the lawn mower over a lawn by pushing the lawn mower.

In an alternate embodiment the method includes propelling the lawn mower over a lawn by driving wheels on the lawn mower with the driven shaft. In this embodiment the propelling step may include carrying a human driver on the lawn mower.

Ordinarily, the propane feeding step includes vaporizing liquid propane. The propane feeding step usually includes injecting gaseous propane into the jet of a carburetor venturi. In preparation for the injection, the propane feeding step typically includes reducing the pressure of the gaseous propane from in excess of 200 pounds per square inch to 1–5 pounds per square inch. Preferably the pressure reduction is to about four pounds per square inch.

The propane feeding step may take the form of delivering propane from a tank carried on the lawn mower.

BRIEF DESCRIPTION OF THE DRAWINGS

The invention will be better understood after a reading of the Detailed Description of the Preferred Embodiment and a review of the drawings in which.

DETAILED DESCRIPTION OF THE PREFERRED EMBODIMENT

Figure 1:
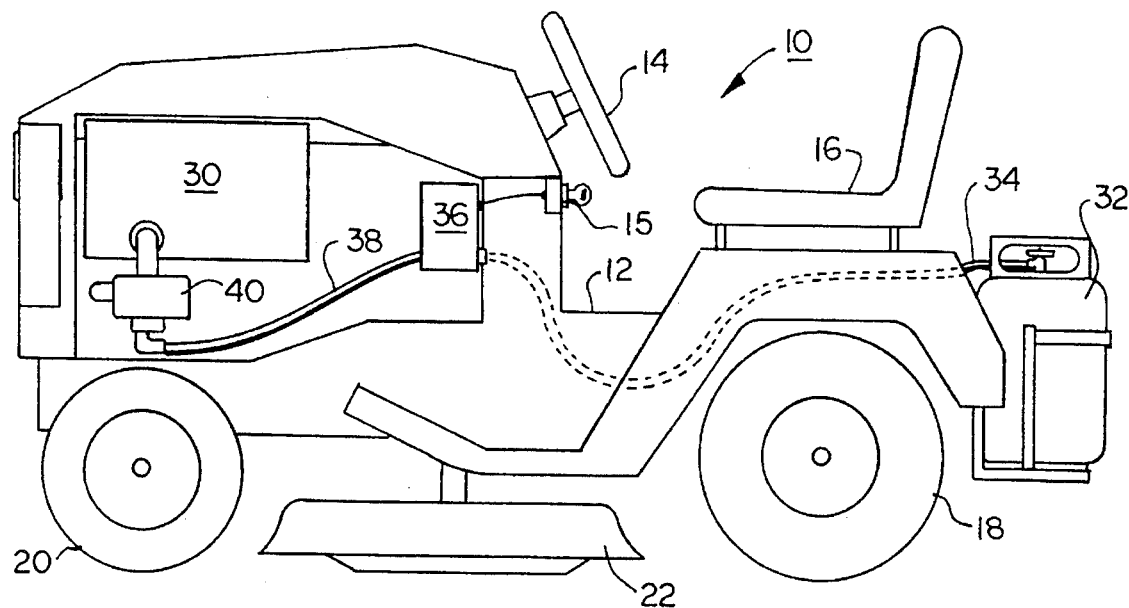
FIG. 1 is s schematic view of a riding lawn mower according to a preferred embodiment of the invention.

FIG. 1 shows a lawn appliance in the form of a riding lawn mower 10 modified in accordance with this invention. The mower includes a standard frame 12 having front wheels 20 and rear wheels 18, a driver's seat 16, and a steering wheel 14. The steering wheel 14 is connected as needed to wheels 20 to provide steering control. The precise connection is optional and is not shown in FIG. 1, as being conventional. The mower also has a blade assembly 22 of a conventional design. The blade assembly 22 is driven by an engine 30 using conventional linkages.

The engine 30 is powered by propane stored in a tank 32 on the rear of the mower 10. The tank 32 is of conventional design holding liquified propane with a vapor space at its top. The liquified propane evaporates to form vapor at a high pressure, which is released along line 34. This is a conventional form of propane supply. The high pressure propane (on the order of 200–250 pounds per square inch gauge) passes along supply line 34 to fuel control system 36.

The fuel control system 36 is connected by wiring to ignition switch 15, as will be discussed in more detail later. Within the fuel control system 36 a positive shut-off valve is included to reliably close the propane supply line 34 when propane is not desired. Also, the fuel control system reduces the pressure from the 200–250 pounds per square inch range to 1–5 pounds per square inch. The reduced pressure propane is supplied over low pressure propane fuel line 38 to modified carburetor 40, from whence it is supplied to the engine 30 through the usual engine intake valves.

Figure 2:
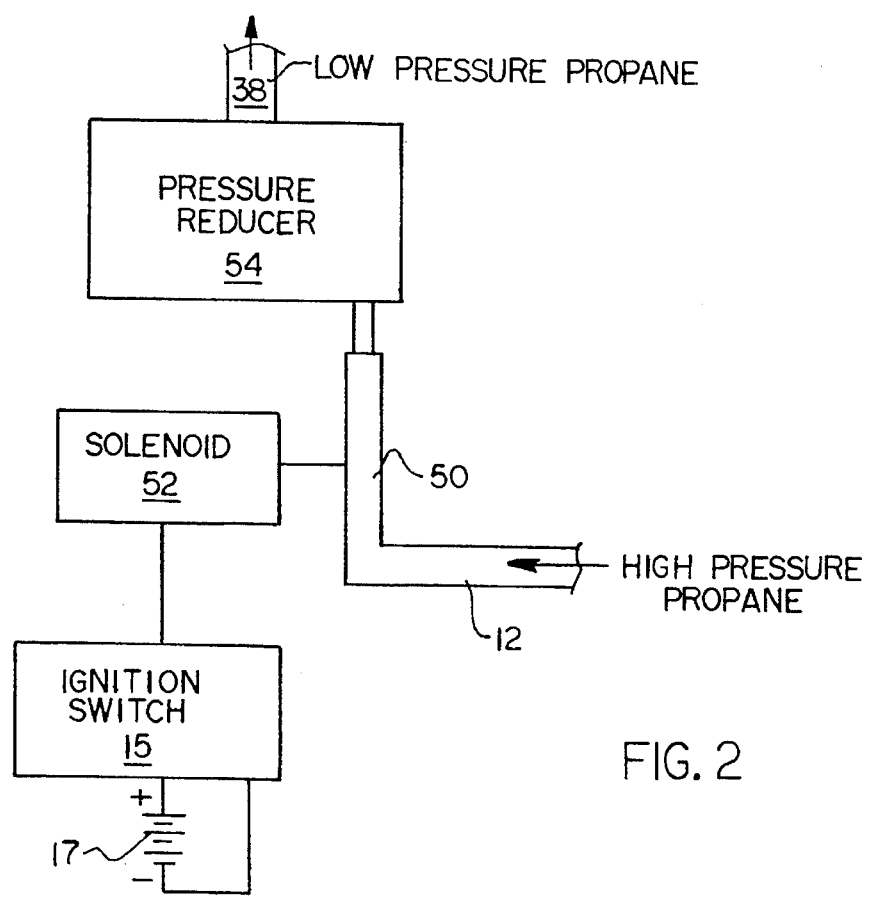
FIG. 2 is schematic view of the fuel control system component of the embodiment of FIG. 1.

Referring now to FIG. 2, the fuel control system 36 will be described in more detail. The high pressure propane line 12 may be hose as supplied by the Gates company, model 20B-HB. Line 12 connects with the fuel lockoff 50 which includes a solenoid 52. In effect, the lockoff 50 is a normally-closed, solenoid-openable valve. Thus, the valve 50 closes the infeed line 12 unless intentionally opened by activation of solenoid 52. A suitable shut-off valve is model FL-218-12E electrical fuel lockoff made by Impco/Beam. Alternate devices are available from Garretson. The solenoid 52 is powered by closing of a pole of ignition switch 15 when it is desired to start or operate the mower engine. Thus, the turning of the ignition switch 15 has the effect of opening the valve 50 to allow the supply of propane to proceed.

Other lockoff devices can be used. For example, a vacuum operated valve can be used once the engine is running, although some mechanism for opening the valve would be needed to be provided in addition to get the engine started.

The electricity source to activate the solenoid 52 can be the normal engine battery 17, coupled with the alternator or generator of the engine (not shown).

Figure 3:
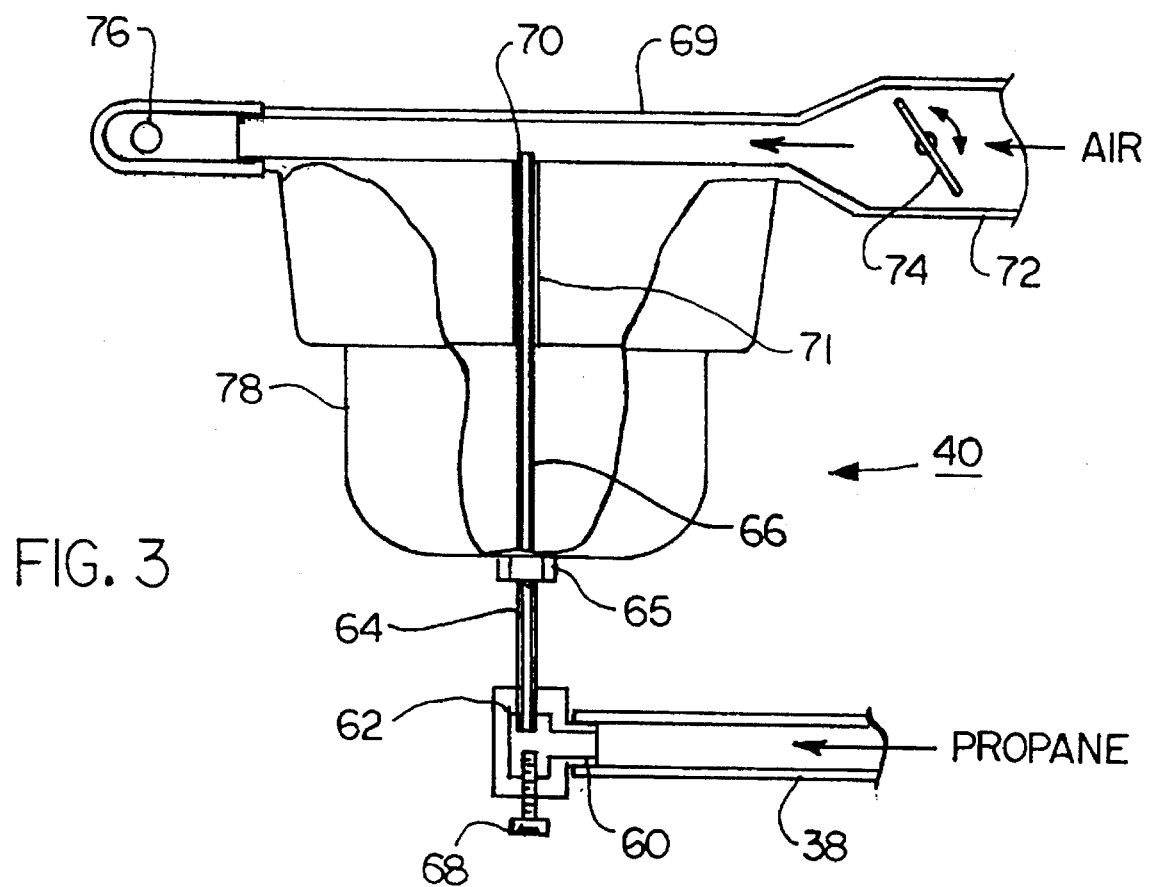
FIG. 3 is view partly in section of a modified carburetor for use in the preferred embodiment.

Downstream of the lockoff 50 is a pressure reducer 54 of conventional design. The pressure reducer 54 reduces the pressure from the range of 200–250 pounds per square inch to a range of 1–5 pounds per square inch. A preferred reduced pressure is about 4 pounds per square inch. This regulator or pressure reducer may be Impco/Beam model 50E. Downstream of the pressure reducer 54, the low pressure propane is supplied over a low pressure supply line 38, which may be a Gates 6 Lola Plus hose. The low pressure supply line 38 leads to the modified carburetor 40 shown in more detail in FIG. 3.

The carburetor 40 is the standard carburetor for the gasoline engine, modified as described herein. Thus, the carburetor 40 has a conventional venturi 69, an air inlet 72, a throttle valve 74 and fuel/air outlet 76. From the outlet 76, the fuel air mixture is delivered to the intake manifold or intake valves of the respective engine cylinders.

The carburetor has been modified by removing the liquid gasoline intake hose and drilling out a channel 71 into the venturi 69. The channel 71 is positioned in alignment with the bottom of the conventional bowl 78 of the carburetor.

The bowl 78 is retained largely for cosmetic purposes, since it no longer serves its conventional liquid fuel holding function. A spud 66 such as Impco/Beam model 2F-256 "spud-in" is inserted into the channel 71, so that a terminal end 70 opens into the venturi 69. The spud is essentially a hollow tube. The terminal end 70 is typically at about a 45 degree angle, with the peak of the remaining tube being oriented toward the air inlet 72. The spud 66 is held in place by threaded fitting 65 to the bowl 78. The bottom end of the spud 66 includes a fitting 62 provided with an inlet 60 to which the low pressure propane fuel line 38 is connected. A set screw 68 is provided with a ball end, to permit the opening to the lower end of the spud 66 to be controlled and thereby to control the amount of propane passing through the spud. This provides a gross adjustment for tuning purposes.

The throttle of the valve 74 of the carburetor provides the main throttle control. As can be appreciated, as the amount of air passing through venturi 69 is controlled by the changing of the position of the throttle 74, the vacuum in the venturi 69 is similarly modified. As the pressure is reduced, the amount of propane delivered through the spud 66 increases.

A prototype, according to the invention, has been made by conversion of a Sears Roebuck Craftsman lawn tractor powered by a Briggs and Stratton 12.5 HP engine. The foregoing specific modification are made to such pre-existing gasoline powered lawn tractor.

The lawn tractor was tested before and after conversion with a KAL EQUIP FOUR GAS EXHAUST ANALYZER. Tests were conducted at idling speed and at full throttle RPMs with the following results:

| EXHAUST COMPONENT | GASOLINE | PROPANE | CHANGE |
|---|---|---|---|
| | IDLE SPEED | | |
| carbon dioxide | 4.34% | 6.63% | +53% |
| carbon monoxide | 3.27% | 0.05% | −65.5X |
| oxygen | 11.85% | 10.42% | −12% |
| hydro carbons | 156 ppm | 43 ppm | −6.3X |
| | FULL THROTTLE RPMS | | |
| carbon dioxide | 4.52% | 9.03% | +100% |
| carbon monoxide | 6.16% | 0.05% | −123X |
| oxygen | 9.13% | 7.11% | −22% |
| hydro carbons | 181 ppm | 8 ppm | −22.5X |

Thus, the conversion of the engine from gasoline power to propane power makes a great decrease in the carbon monoxide and hydrocarbon emissions, both contributors to air pollution. The much more benign emission, carbon dioxide does increase.

The engine operates satisfactorily on propane despite having been originated to operate on gasoline. When the mower was left running in a double garage, none of the acrid bluish smoke that results in a stinging sensation of the eyes and choking to most people appeared when the mower ran on propane.

In addition, the engine had excellent starting characteristics. The power output appeared to be about equal to the power of the gasoline engine, although dynamometer tests have not been made.

While the invention has been described most particularly with a riding-type lawn mower, various other lawn and garden appliances may be equipped with propane in accordance with the invention. These include push-type lawn mowers, chipper shredders, blowers, and the like. Virtually any gasoline-powered, four-cycle engine can be converted to propane power. Supply from a remote tank through a hose to the appliance could be used if desired.

Alternatively, a carried device such as a string trimmer or blower powered by an internal combustion engine can be designed within the scope of the invention. The Coleman Co. produces propane tanks for use on lanterns and the like, and these can be mounted on a carried device in place of the existing gasoline tank, without disturbing the balance already engineered into the device. In such a machine, the lockoff is desirably a vacuum activated model (such as Beam/Impco VFF30), to avoid having to add the weight of a battery for an electric lockoff. This sort of lockoff would also be suitable for other devices not having a battery, such as a push mower. A manual lockoff open switch can be used for starting.

While the invention has been described with reference to propane, that term should be construed to include any commercially available gas available for combustion and the vaporous state including, butane, liquid propane gas and natural gas.

As regard the engines, four cycle engines must be used. An overhead valve engine is preferred, although a flathead engine could be used. The flathead engine has a shorter lifetime running on propane gas than on gasoline. The engine can be a single or a twin cylinder engine.

Those of ordinary skill in the art may appreciate that various changes can be made from the specific embodiment enclosed herein. The invention is capable of a broad interpretation, in accordance with the claims.

All pressure measurements recited herein are in pounds per square inch gauge, unless otherwise specified.

What is claimed is:

1. A low-polluting lawn mower comprising
   a frame having ground-engaging wheels,
   a four-cycle engine mounted on said frame and having a drive shaft,
   a propane gas supply on said frame,
   a fuel connection from said propane gas supply to said engine including a carburetor having a venturi and a spud to feed propane to said venturi, and
   a blade operatively engaged with said drive shaft so as to be driven for cutting grass when said engine is fueled by propane from said supply.

2. A lawn mower as claimed in claim 1 wherein said propane gas supply includes a tank containing liquified propane.

3. A lawn mower as claimed in claim 1 wherein said drive shaft is operatively engaged with one of said wheels so that operation of said engine propels the lawn mower.

4. A lawn mower as claimed in claim 3 wherein said frame further comprises a seat for a driver and a steering mechanism to permit the driver to control the direction of movement of the lawn mower.

5. A lawn mower as claimed in claim 1 wherein said fuel connection comprises a fuel control assembly including a regulator that reduces the pressure of the gaseous propane from in excess of 200 pounds per square inch to about 4 pounds per square inch.

6. A lawn mower as claimed in claim 1 wherein said fuel connection comprises a fuel control assembly including a regulator and an electric fuel lockoff.

7. A lawn mower as claimed in claim 6 wherein said lockoff is a normally closed, electrically-openable valve to positively close the fuel connection when operation is not desired.

8. A lawn mower as claimed in claim 7 further comprising an ignition switch coupled to said engine having an on position and an off position to operate said engine when said switch is in its on position and to turn said engine off when in said off position, said ignition switch including a pole connection to said electrically-operable valve to open said valve when said ignition switch is in said on position.

9. A lawn mower as claimed in claim 1 wherein said fuel connection comprises a carburetor having a venturi and a spud to feed propane to said venturi and a fuel control assembly including a regulator and an electric fuel lockoff.

10. A lawn mower as claimed in claim 1 wherein said fuel connection comprises a fuel control assembly including a regulator that reduces the pressure of the gaseous propane from in excess of 200 pounds per square inch to 1–5 pounds per square inch.

11. A lawn mower as claimed in claim 1 wherein said fuel connection comprises a carburetor having a venturi and a spud to feed propane to said venturi, said spud configured as a hollow tube to convey gaseous propane to said venturi.

12. A lawn mower as claimed in claim 11 wherein said carburetor includes a metering valve upstream of said venturi.

13. A lawn mower as claimed in claim 11 wherein said hollow tube has an upstream end and an adjustable valve at said upstream end to control the amount of propane said spud delivers to said venturi.

14. A low-polluting lawn mower comprising
   a frame having ground-engaging wheels,
   a seat for a driver and a steering mechanism to permit the driver to control the direction of movement of the lawn mower on the frame,
   a four-cycle engine mounted on said frame and having a drive shaft operatively engaged with one of said wheels so that the engine propels said lawn mower,
   a propane gas supply on said frame including a tank containing liquified propane,
   a fuel connection from said propane gas supply to said engine including a carburetor having a venturi and equipped with a spud to feed propane to said venturi and a fuel control assembly including a regulator and a fuel lockoff, and
   a blade operatively engaged with said drive shaft so as to be driven for cutting grass when said engine is fueled by propane from said supply.

15. A low-polluting lawn appliance comprising
   a frame having ground-engaging wheels,
   a four-cycle engine mounted on said frame and having a drive shaft,
   a propane gas supply on said frame,
   a fuel connection from said propane gas supply to said engine including a fuel control assembly having a regulator and a fuel lockoff, and
   a tool operatively engaged with said drive shaft so as to be driven for accomplishing work when said engine is fueled by propane from said supply.

16. A method of cutting grass comprising the steps of
   providing a lawn mower having an engine equipped to burn propane,
   providing a propane supply to the engine, through a carburetor having a venturi including providing the propane to the venturi through a spud,
   feeding propane from said propane supply to the engine and burning the propane in the engine to drive a shaft, and moving a blade affixed to the shaft in proximity to grass to cut the grass.

17. A method as claimed in claim 16 further comprising propelling the lawn mower over a lawn by pushing the lawn mower.

18. A method as claimed in claim 17 wherein said propane feeding step comprises delivering propane from a tank carried on the lawn mower.

19. A method as claimed in claim 16 wherein said propane feeding step comprises reducing the pressure of the gaseous propane from in excess of 200 pounds per square inch to about four pounds per square inch.

20. A method as claimed in claim 16 further comprising propelling the lawn mower over a lawn by driving wheels on the lawn mower with the driven shaft.

21. A method as claimed in claim 20 wherein said propelling step includes carrying a human driver on the lawn mower.

22. A method as claimed in claim 16 wherein said propane feeding step comprises vaporizing liquid propane.

23. A method as claimed in claim 16 wherein said propane feeding step comprises injecting gaseous propane into the jet of a carburetor venturi.

24. A method as claimed in claim 16 wherein said propane feeding step comprises reducing the pressure of the gaseous propane from in excess of 200 pounds per square inch to 1–5 pounds per square inch.

25. A method of cutting grass comprising the steps of providing a lawn mower having an engine equipped to burn propane, providing a propane supply to the engine, feeding propane from said propane supply to the engine by vaporizing liquid propane, reducing the pressure of propane to about 1–5 pounds per square inch gauge, and injecting gaseous propane into the jet of a carburetor venturi burning the propane in the engine to drive a shaft, propelling the lawn mower over a lawn by driving wheels on the lawn mower with the driven shaft, and moving a blade affixed to the shaft in proximity to grass to cut the grass.

* * * * *